Dec. 8, 1931.  W. R. GILLAM  1,835,038
RIM
Filed Jan. 30, 1925   2 Sheets-Sheet 1
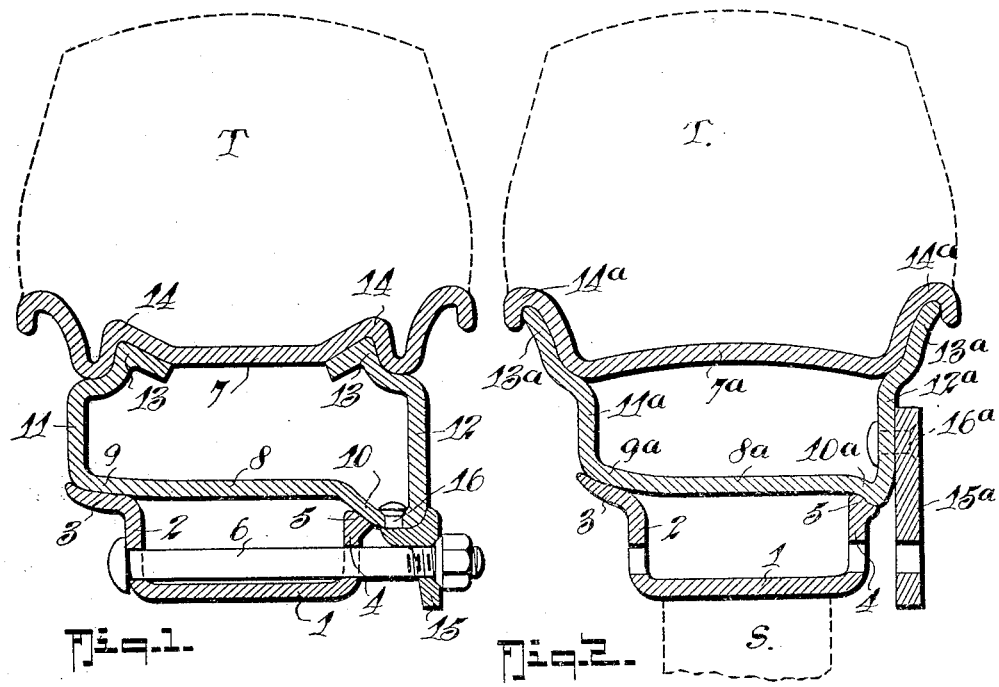
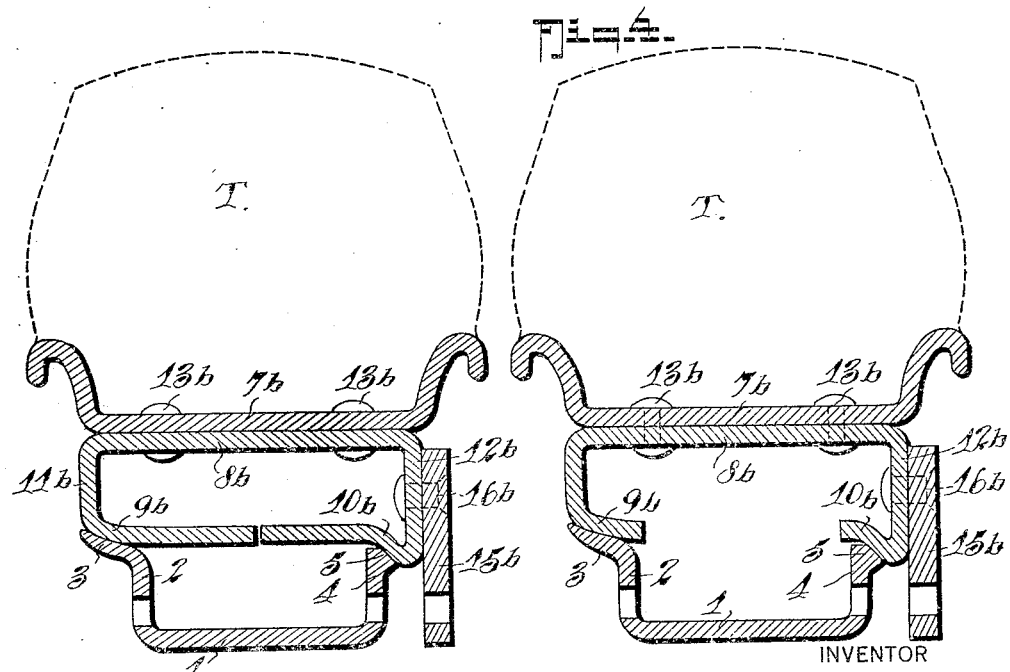
INVENTOR
W. R. Gillam.
BY
ATTORNEY Dec. 8, 1931.  W. R. GILLAM  1,835,038
RIM
Filed Jan. 30, 1925  2 Sheets-Sheet 2
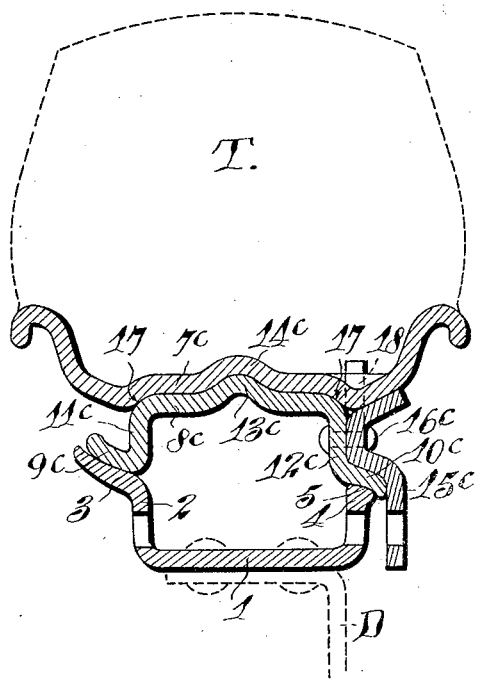
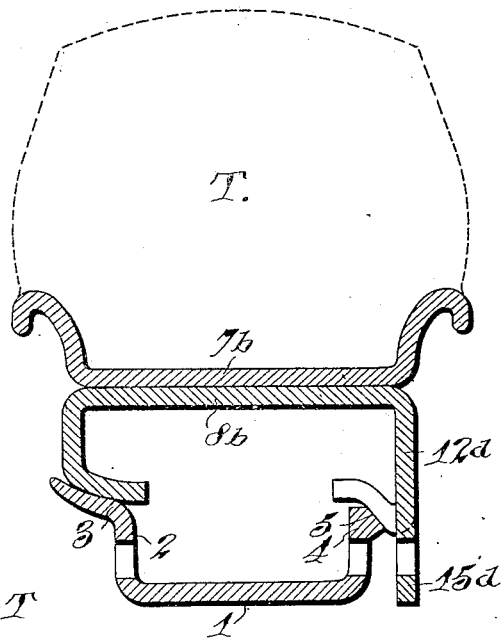
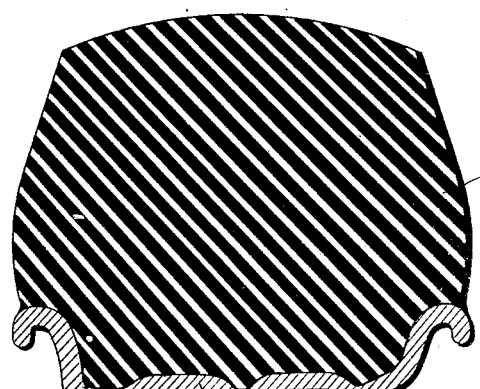
INVENTOR
W. R. Gillam.
BY
Albert E. Dietrich
ATTORNEY Patented Dec. 8, 1931

1,835,038

UNITED STATES PATENT OFFICE

WALLACE R. GILLAM, OF TALLMADGE, OHIO, ASSIGNOR TO LAMBERT TIRE & RUBBER CO., OF BARBERTON, OHIO, A CORPORATION OF ARIZONA

RIM

Application filed January 30, 1925. Serial No. 5,868.

My invention relates to certain new and useful improvements in rim structures for mounting tires on wheels and the invention particularly has for its object to provide means whereby a cushion tire of a smaller cross sectional size may be substituted for a balloon type tire of larger cross sectional size without the necessity of changing wheels or felloe bands. In other words, the present invention has for its object to provide a rim structure by which a cushion tire having approximately the same peripherial dimension or diameter as a balloon type tire but being of a lesser depth than that of the balloon tire may be used on wheels that have been formerly equipped with the balloon tires.

It is a matter of common knowledge that wheels and their felloe bands which are provided for use on machines equipped with balloon tires are of a smaller diameter than wheels that are to be equipped with tires not of the balloon type.

It is the chief object of the invention, as before intimated, to provide some means whereby it is possible to use the same wheels and felloe bands as are standard equipment when furnished with balloon tires where it is desired to use cushion tires for example and to do this without the necessity of making a cushion tire of substantially the same cross section as the balloon tire.

In carrying out my invention I provide a rim unit composed of two parts, one of which constituting a rim proper, receives the tire while the other, constituting the filler rim, occupies the space between the rim proper and the felloe band of the wheel on which it is to be used, the two rim parts, however, preferably, being permanently held together as a single unit, the parts being so designed with respect one to the other and to the felloe band as to reduce labor of substituting the cushion tire for the balloon tire to the minimum.

Another object of the invention is to provide a rim unit for the purposes stated made entirely of rolled or sheet metal so as to reduce the cost of manufacture as well as to reduce the weight of the parts to a minimum.

In the drawings:

Figure 1 is a cross section illustrating one embodiment of my invention.

Figure 2 is a cross section illustrating a modification of the embodiment shown in Figure 1.

Figure 3 is a cross section illustrating another embodiment of my invention.

Figure 4 is a similar cross section of a modification of the embodiment shown in Figure 3.

Figure 5 is a cross section showing another modification of the embodiment shown in Figure 3.

Figure 6 is a cross section showing a further modification of the embodiment shown in Figure 3.

Figure 7 is a cross section illustrating still another embodiment of the invention which is a further modification of the embodiment illustrated in Figures 3 and 6.

In the drawings 1 designates a felloe band of a standard type, such for example as is used on Ford one-ton trucks equipped with balloon type tires. In the example given the outside diameter of the wheel with the felloe band is approximately twenty inches and takes a tire of a size thirty inches by five inches. Now if it is desired to replace the pneumatic tire with a cushion tire, on a rim whose diameter is such as to fit on the felloe band 1, and yet maintain the outside diameter of the tire, it would be necessary to have a cushion tire of approximately the same cross section as the pneumatic. This not only would result in a greater increased cost for the cushion tire but would also add unnecessary weight to the car, since a cushion tire to sustain the same load as a given pneumatic tire may be made of a considerably lesser cross section than the pneumatic tire. Therefore, in order to enable a cushion tire T of normal cross section to be fitted to cars whose wheels are designed for balloon or other pneumatic tires of that general size, without the necessity of changing wheels or felloe bands, I provide a two part rim unit which consists of the rim proper 7 on which the tire T is molded, and the filler rim which comprises a ring of channeled or tubular sheet metal secured to the rim proper in such manner as to constitute therewith a unitary structure, the filler rim occupying the space between the rim proper and the felloe band and having provisions to fit on the felloe band and be held in place by the usual securing bolts and nuts 6.

The filler rim may be of varying forms in cross section, examples of which are given in the drawing. In the several views of the drawings those parts which are of the same form and construction bear the same reference numbers and those parts which are of a modified form but perform the same functions bear the same reference characters in the figures succeeding Figure 1 as in Figure 1 plus an index letter.

In all of the figures 1 designates the usual standard felloe band having the side flanges 2 and 4 and the rim seats 3 and 5 respectively, the side flanges being apertured at suitable intervals for the passage of the securing bolts 6 and their nuts which hold the rim on the felloe band.

In the first embodiment of the invention, that illustrated in Figure 1, the filler rim comprises a continuous band or ring 8 having portions 9 and 10 to rest on the seats 3 and 5 of the flanges 2 and 4 respectively. The filler rim also includes the side flanges 11 and 12, and the portions 13 which are interlocked with the portions 14 of the rim proper 7. The rim unit, it will thus be seen, consists of the rim proper and the filler rim which together constitute a unitary structure.

Suitably spaced securing lugs 15 may be fastened at 16 to the filler rim to cooperate with the usual bolts and nuts 6 in retaining the rim unit in position on the felloe band.

In Figure 2 is shown a modification of the embodiment illustrated in Figure 1, and by reference to this figure it will be noted that the parts 13a of the filler rim, which interlock with the parts 14a of the rim proper 7a, are extended outwardly and the parts 14a are the side beads of the flanges of the rim proper. In this form also it will be observed that the securing lugs 15a are secured to the side flange 12a.

In the embodiment of the invention illustrated in Figure 3 the band 8b is reversed as to position from what is shown in Figures 1 and 2, that is to say, the band portion 8b is placed in contact with the rim proper 7b to which it is secured by rivets 13b or other suitable holding means, and the filler rim is in the form of a substantially closed tube of approximately rectangular cross section, the bearing surfaces 9b—10b engaging the felloe seats 3 and 5 and extending inwardly to approximately contact with each other, or they may be separated as indicated in the embodiment illustrated in Figure 4 in which parts having the same structure as in Figure 3 bear the same reference characters.

In Figure 5 is shown a further modification of the embodiment illustrated in Figure 4, and by reference to this figure it will be seen that the band 8c has the side flanges 11c—12c bent outwardly to constitute the rest portions or bearing members 9c—10c that rest on the felloe band seats 3 and 5. In this embodiment also the rim proper 7c is shaped to embrace the edges of the filler rim as at 17—17, and the two rim parts are further secured together by interlocking teats 14c—13c as indicated. In this embodiment also the securing lugs 15c are secured at 16c to the side flange 12c and are also secured at 18 by a riveting process to the rim proper 7c.

In Figure 6 is illustrated a further modification of the embodiment shown in Figures 3 and 4. By reference to this figure it will be noted that the securing lugs 15d are stamped out to form a continuation of the side flange 12d.

The embodiment shown in Figure 7 is a preferred embodiment and it will be noted that the same similar scheme of the preceding embodiments is carried out. In this figure the rim proper 7e is interlocked with the band 8e by teats 14e and 13e and is further held in place by the overlapping portions 17e in a manner similar to the embodiment shown in Figure 5. In this embodiment the securing lug is dispensed with and in lieu thereof the side flange 12e is carried down to form an extension 15e which is apertured at suitable intervals to receive the securing bolts 6 and takes the place of the succession of lugs 15—15a, etc.

The depth or thickness of the filler rim will, of course, depend upon the differences in diameter between the rim proper and the felloe band and are subject to more or less modification as to this feature. The felloe band 1 may be carried on the usual spokes S shown in dotted lines for example in Figure 2, or it may be secured in any suitable way to the usual disk wheels D indicated in dotted lines in Figure 5, it being not material to my invention how the wheel itself is constructed or how the felloe band 1 is fastened thereto or made a part thereof.

Other modifications of my invention will suggest themselves to those skilled in the art and I do not desire to be confined to the precise details of structure shown and described beyond the extent to which they may be specifically referred to in the appended claims.

From the foregoing description, taken in connection with the accompanying drawings, it is thought the complete construction, operation and advantages of my invention will be clear to those skilled in the art.

What I claim is:

1. In a means for the conversion of a pneumatic-tired wheel of standard make having a fixed rim formed of an annular band and side walls having rim seats at their edges formed to receive a pneumatic-tire with its demountable rim, into a cushion-tired wheel; the combination with the fixed rim, of an adapter comprising a channelled ring having a peripheral wall and side walls, one of said side walls having a flange to seat on one of the fixed rim side wall flanges, the other side wall of the adapter having a seat portion adapted to seat on the other rim seat of the fixed rim, means carried by said adapter and lapping over one of the side walls of said fixed rim and apertured to receive securing bolts, and securing bolts passed through said fixed rim side walls and said apertures to secure said adapter in place, and a cushion-tire rim carried by said adapter and secured to the same, the radius of the adapter and the cushion tire rim being such that said radius plus the thickness of the cushion tire which is carried by the rim will be substantially the same as the radius of the pneumatic tire and demountable rim it replaces, so that the adapter and its cushion rim may have substantially the same tread circumference as the replaced pneumatic tire and demountable rim.

2. In a means for the conversion of a pneumatic-tired wheel of standard make having a fixed rim formed of an annular band and side walls having rim seats at their edges formed to receive a pneumatic-tire with its demountable rim, into a cushion-tired wheel; the combination with the fixed rim, of an adapter comprising a channelled ring having a peripheral wall and side walls, one of said side walls having a flange to seat on one of the fixed rim side wall flanges, the other side wall of the adapter having a seat portion adapted to seat on the other rim seat of the fixed rim, means carried by said adapter and lapping over one of the side walls of said fixed rim and apertured to receive securing bolts, and securing bolts passed through said fixed rim side walls and said apertures to secure said adapter in place, a cushion-tire rim carried by said adapter and secured to the same, said cushion-tire rim and said adapter having interengaging portions to hold the same against lateral motion relatively to one another, the radius of the adapter and the cushion tire rim being such that said radius plus the thickness of the cushion tire which is carried by the rim will be substantially the same as the radius of the pneumatic tire and demountable rim it replaces, so that the adapter and its cushion rim may have substantially the same tread circumference as the replaced pneumatic tire and demountable rim.

3. A means for the conversion of a pneumatic-tire wheel of standard make having a fixed channelled rim formed of an annular band and side walls having rim seats at their edges to receive a pneumatic-tire with its demountable rim, into a cushion-tired wheel; said means comprising an adapter consisting of a channelled ring having an outer peripheral wall and side walls, one of said walls terminating in a flange to seat on one of the fixed rim seats, the other side wall having a laterally bent portion constituting a member adapted to seat on the other fixed rim seat, said last named side wall of the adapter being further extended parallel to and over-lapping the adjacent side wall of the fixed rim, and having bolt holes, securing bolts passing through the side walls of the fixed rim and through said bolt holes to secure the adapter in place, and a cushion-tire rim carried by the adapter, the radius of the adapter and the cushion tire rim being such that said radius plus the thickness of the cushion tire which is carried by the rim will be substantially the same as the radius of the pneumatic tire and demountable rim it replaces, so that the adapter and its cushion rim may have substantially the same tread circumference as the replaced pneumatic tire and demountable rim.

4. A means for the conversion of a pneumatic-tire wheel of standard make having a fixed channelled rim formed of an annular band and side walls having rim sides at their edges to receive a pneumatic-tire with its demountable rim, into a cushion-tired wheel; said means comprising an adapter consisting of a channelled ring having an outer peripheral wall and side walls, one of said side walls terminating in a flange to seat on one of the fixed rim seats, the other side wall having a laterally bent portion constituting a member adapted to seat on the other fixed rim seat, said last named side wall of the adapter being further extended parallel to and overlapping the adjacent side wall of the fixed rim, and having bolt holes, securing bolts passing through the side walls of the fixed rim and through said bolt holes to secure the adapter in place, a cushion-tire rim carried by the adapter, and means for securing said cushion-tire rim to the adapter rigidly as a unitary structure, the radius of the adapter and the cushion tire rim being such that said radius plus the thickness of the cushion tire which is carried by the rim will be substantially the same as the radius of the pneumatic tire and demountable rim it replaces, so that the adapter and its cushion rim may have substantially the same tread circumference as the replaced pneumatic tire and demountable rim.

5. A means for the conversion of a pneumatic-tire wheel of standard make having a fixed channeled rim formed of an annular band and side walls having rim sides at their edges to receive a pneumatic-tire with its demountable rim, into a cushion-tired wheel;

said means comprising an adapter consisting of a channelled ring having an outer peripheral wall and side walls, one of said side walls terminating in a flange to seat on one of the fixed rim seats, the other side wall having a laterally bent portion constituting a member adapted to seat on the other fixed seat, said last named side wall of the adapter being further extended parallel to and overlapping the adjacent side wall of the fixed rim, and having bolt holes, securing bolts passing through the side walls of the fixed rim and through said bolt holes to secure the adapter in place, a cushion-tire rim carried by the adapter, means for securing said cushion-tire rim to the adapter as a unitary structure, said last named means including interlocking projections and depressions, the radius of the adapter and the cushion tire rim being such that said radius plus the thickness of the cushion tire which is carried by the rim will be substantially the same as the radius of the pneumatic tire and demountable rim it replaces, so that the adapter and its cushion rim may have substantially the same tread circumference as the replaced pneumatic tire and demountable rim.

6. In demountable rims, a rim proper comprising an annular base with outwardly projected side flanges adapted to receive a tire, a filler rim comprising an annular band and side walls, said annular base of the rim proper and said filler rim having interlocking portions and said rim proper being shrunk on said filler rim, said filler rim also including side flanges extending toward the axis of the rim, said side flanges having laterally extended portions providing means for engaging with a felloe band or fixed rim, one of said side flanges having bolt receiving portions by which it may be secured in place on the felloe band or fixed rim substantially as shown and described.

7. In demountable rims, a rim proper comprising an annular base with outwardly projected side flanges to receive a tire, a filler rim comprising an annular base onto which the annular base of the rim proper is shrunk, said bases having interlocking portions, the base of said rim proper being curved over the side edges of the filler base to prevent lateral displacement, said filler rim also including side flanges extending toward the axis of the rim, said side flanges having laterally extended edge portions providing means for engaging with a felloe band, one of said side flanges having bolt receiving portions by which it may be secured in place on the felloe band substantially as shown and described.

8. In a means for the conversion of a pneumatic-tired wheel of standard make having a fixed rim formed of an annular band and side walls having rim seats at their edges formed to receive a pneumatic-tire with its demountable rim, into a cushion-tired wheel; the combination with the fixed rim of an adapter comprising side walls, one of said side walls having a flange to seat on one of the fixed rim side wall flanges, the other side wall of the adapter having side portions adapted to seat on the other rim seat of the fixed rim, means carried by said adapter and lapped over one of the side walls of said fixed rim and apertured to receive securing bolts, securing bolts passed through said fixed rim side walls and said apertured means to secure said adapter in place, means uniting said side walls and constituting therewith a rigid structure, a cushion-tired rim carried by and secured to said adapter, all being arranged whereby said cushion-tired rim and said adapter may be removed or placed with respect to said fixed rim, as a unit, the radius of the adapter and the cushion tire rim being such that said radius plus the thickness of the cushion tire which is carried by the rim will be substantially the same as the radius of the pneumatic tire and demountable rim it replaces, so that the adapter and its cushion rim may have substantially the same tread circumference as the replaced pneumatic tire and demountable rim.

9. A wheel assembly including a felloe provided with seating surfaces for a tire-carrying rim, an annular member demountably secured upon the seating surfaces for supporting one edge portion of a tire carrying band of greater internal diameter than the rim and means associated with the member for supporting the opposite edge portion of the base band.

WALLACE R. GILLAM.